No. 804,050. PATENTED NOV. 7, 1905.
J. R. ROGERS.
LOGOTYPE MACHINE.
APPLICATION FILED MAY 25, 1905.

WITNESSES:
Ole Burdine
A. M. E. Kennedy

INVENTOR
J. R. Rogers
BY P. T. Dodge
ATTORNEY

No. 804,050. PATENTED NOV. 7, 1905.
J. R. ROGERS.
LOGOTYPE MACHINE.
APPLICATION FILED MAY 25, 1905.

WITNESSES:

INVENTOR
J. R. Rogers
BY
P. T. Dodge
ATTORNEY

No. 804,050. PATENTED NOV. 7, 1905.
J. R. ROGERS.
LOGOTYPE MACHINE.
APPLICATION FILED MAY 25, 1905.

No. 804,050. PATENTED NOV. 7, 1905.
J. R. ROGERS.
LOGOTYPE MACHINE.
APPLICATION FILED MAY 25, 1905.
8 SHEETS—SHEET 6.

No. 804,050. PATENTED NOV. 7, 1905.
J. R. ROGERS.
LOGOTYPE MACHINE.
APPLICATION FILED MAY 25, 1905.

UNITED STATES PATENT OFFICE

JOHN R. ROGERS, OF BROOKLYN, NEW YORK, ASSIGNOR TO MERGENTHALER LINOTYPE COMPANY, A CORPORATION OF NEW YORK.

LOGOTYPE-MACHINE.

No. 804,050.     Specification of Letters Patent.     Patented Nov. 7, 1905.

Application filed May 25, 1905. Serial No. 262,249.

*To all whom it may concern:*

Be it known that I, JOHN R. ROGERS, of Brooklyn, county of Kings, and State of New York, have invented a new and useful Improvement in Logotype-Machines, of which the following is a specification.

My invention relates to a machine adapted to produce type-forms consisting of justified lines of logotypes, the machine producing at each action a series or line of logotypes and the necessary intermediate spaces for justifying the line to the predetermined length.

It embraces as its leading features, first, a series of circulating slotted matrices and means for assembling them in lines, presenting the lines to the mold and thereafter to a distributing mechanism, and, second, a series of expansible circulating spacers, which are composed with the lines of matrices and adapted to serve the double purpose of expanding or justifying the matrix-line and of forming spaces of suitable width to justify the line of logotypes when they are transferred to the galley.

I have represented my improvements in connection with a machine of the same general organization as the Mergenthaler linotype-machine represented in United States Letters Patent No. 557,000, and it is to be understood that as regards the magazines containing the matrices and spacers, the devices for assembling them in line, the metal-pot and its adjuncts, and the devices for distributing the line subsequent to the casting operation, they may be of the same construction as in the linotype-machine or of any other suitable construction.

Figures 14, 15, 16, 17:
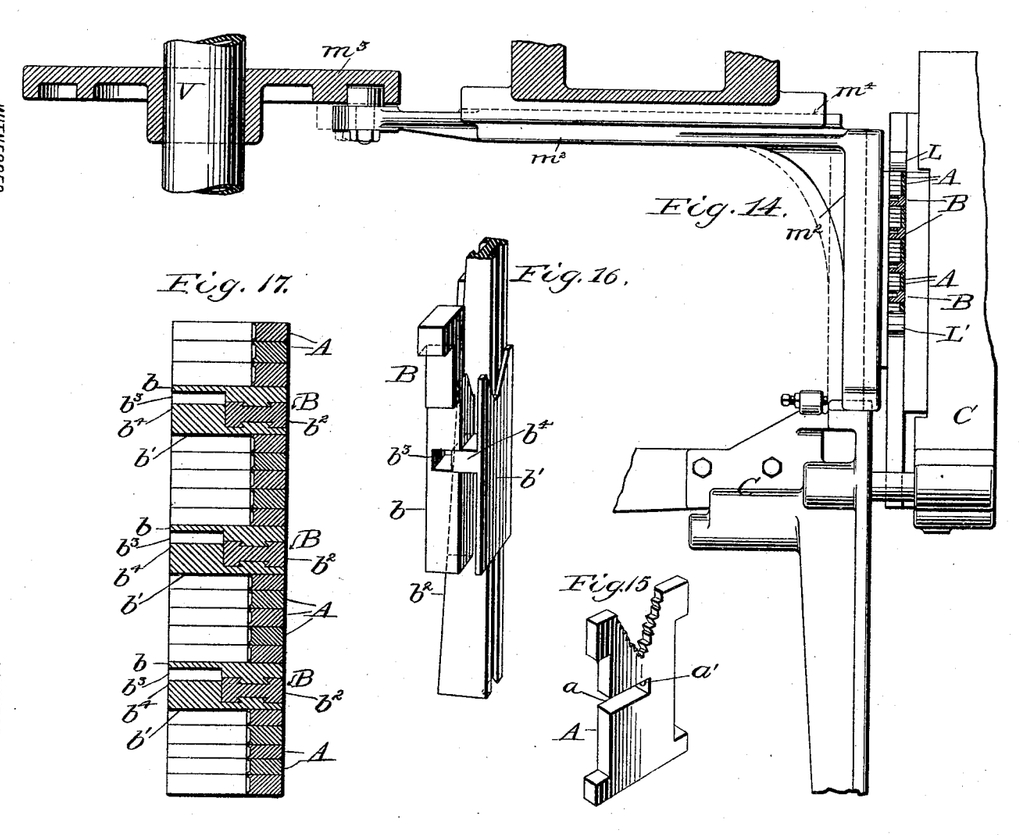
Fig. 14 is a horizontal section on the line 14 14 of Figs. 1, 5, and 12.
Fig. 15 is a perspective view of one of the matrices.
Fig. 16 is a perspective view of one of the spacers.
Fig. 17 is a horizontal section through the line of matrices and the space-forming spacers therein.

*Matrices and spacers.*—I employ as the basis of the machine a series of matrices A, as shown in Fig. 15, and a series of expanding-spacers B, such as shown in Fig. 16.

Each matrix consists of a flat metal plate having in one edge a deep slot $a$, with the character or matrix proper $a'$ at its bottom. The slot is of a size and form corresponding to the cross-section of the required logotypes, so that when a series of matrices are assembled side by side their slots will stand in line or register and form a mold or series of molds in which the logotypes may be cast. The matrices are formed with protruding ears at their two ends and with a toothed distributing-notch in the upper end, as in the matrices of the ordinary commercial linotypes familiar to all skilled in the art.

Figure 12:
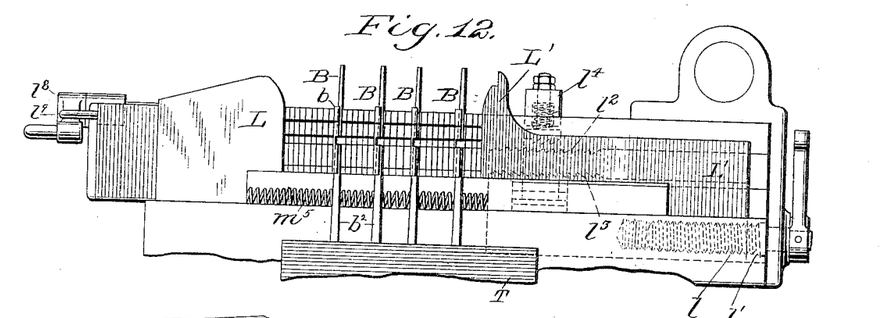
Fig. 12 is a rear elevation of the composed line of matrices and spacers, together with means for sustaining them and for operating the justifying-spacers.

The spacers B used in the composed lines of matrices between the words are constructed, first, to elongate or justify the line to a predetermined length, and, second, to serve as adjustable molds in which to cast spaces of widths suitable to justify the line of logotypes, a series of logotypes and the spaces for use between them being formed at one operation. The spacers B consist, as shown in Figs. 16 and 17, of three principal parts, the plates $b$ and $b'$ and the intermediate sliding wedge $b^2$. The plate or body portion $b$ has a marginal form similar to that of the matrices and is constructed with a mold cell or cavity $b^3$ in one edge. The plate $b'$ is formed with a projection $b^4$, extending into the mold-cell and forming an adjustable side therefor. The wedge $b^2$ contains longitudinal dovetail grooves in its opposite sides to receive and hold corresponding vertical ribs formed on the inner faces of the parts $b$ and $b'$, as shown in Fig. 17. These parts have their inner faces tapered in the reverse direction from the surfaces of the wedge, so that as the wedge is moved upward and downward between them they will be separated to a greater or less extent, and thus the total thickness of the spacer increased or diminished as necessary to effect the justification of the line of matrices in which the spacers may be seated, as shown in Figs. 12 and 17. As the spacer is thus adjusted in thickness the projection $b^4$ is caused to move inward or outward in the mold-cell $b^3$, so that the width of this mold and the space cast therein will be varied to correspond with the thickness of the spacer. The inner or bottom wall of the cell $b^3$ and also its upper and lower walls and one side wall are formed in the part $b$, and its forward end is at all times open, so that molten metal may freely enter.

Figure 10:
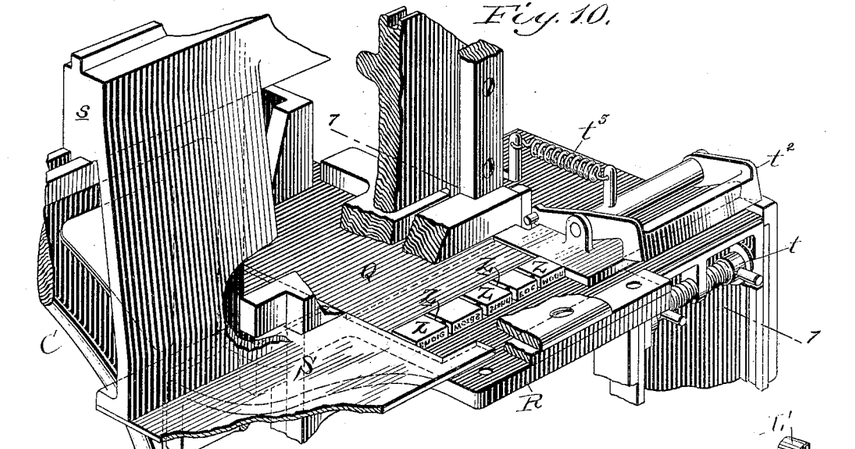
Fig. 10 is a perspective view looking from the front and showing the parts by which the lines of logotypes are ejected and delivered endwise to the galley.
Figure 11:
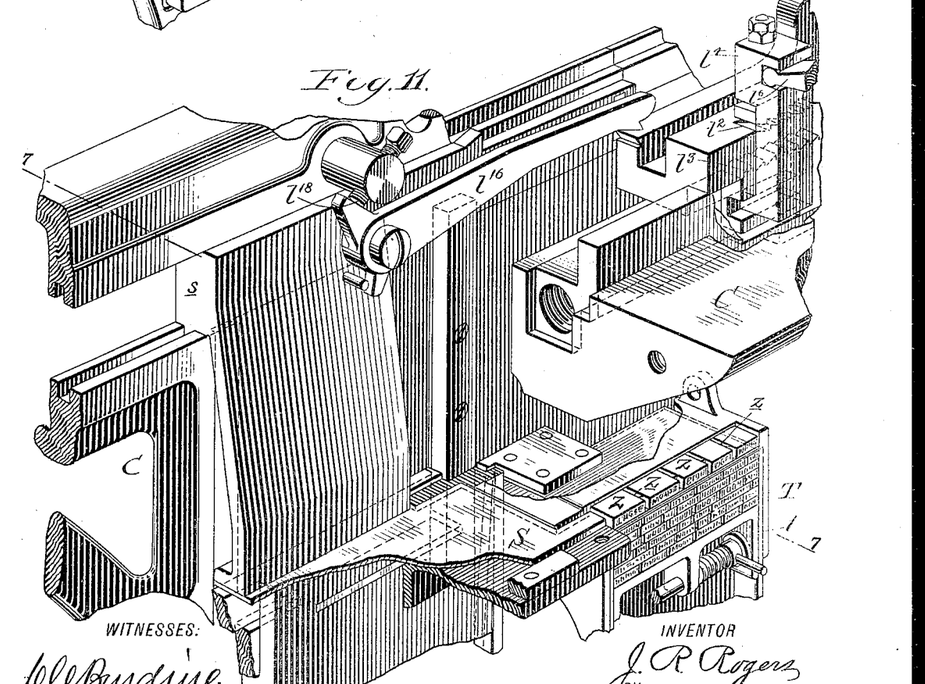
Fig. 11 is a perspective view looking from the front, showing the receiving galley and various adjacent parts.

When the spacers are inserted in the line between the groups of matrices representing word characters commonly known as "word groups," the parts will bear the relation shown in Figs. 12 and 17, and there will be represented in the matrices a series of molds suitable for the formation of logotypes, these molds being separated by the spacers, which contain cells suitably adjusted in size to produce spaces which will effect the justification of the line of logotypes after they have been removed from the cells and assembled in close order against the intervening logotypes, as shown in Figs. 10 and 11.

The machine hereinafter described is designed to assemble the matrices and spacers in line in the required order, then adjust the spacers to justify the line, next cast from the justified line a series or line of logotypes and the intermediate justifying-spaces, and finally deliver these lines successively to the galley.

Figure 1:
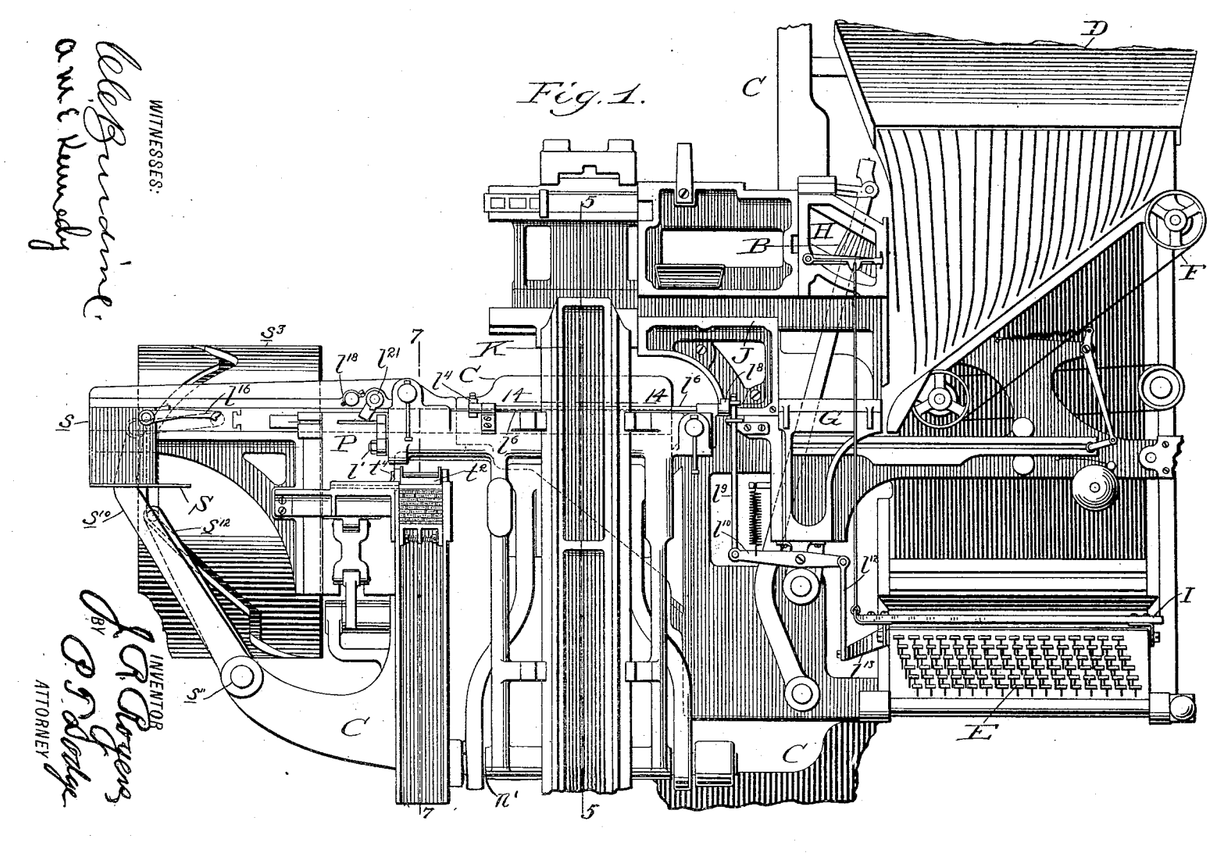
Figure 1 is a front elevation of the composing and casting mechanism and adjacent parts of a machine in accordance with my invention.

Referring to Fig. 1, C is the rigid main frame, which may be of any form and construction adapted to sustain the various operative parts. D represents an inclined channeled magazine in which the matrices A are stored; E, a series of finger-keys connected through intermediate parts with escapement devices in the mouth of the magazine to release the matrices one at a time in the required order; F, an inclined belt upon which the matrices fall and by which they are delivered in a downward direction to the channeled assembler G, in which they are arranged in line side by side. H is a magazine in which the spacers B are stored and from which they are delivered through intermediate devices by the space-key I, so that they may descend into the assembler G for incorporation in the composed line of matrices. The assembler G is arranged to rise under the influence of a hand-lever and deliver the composed line to a horizontally-moving carrier, by which it is transferred to the left through the stationary channel J to the channeled head of a vertically-movable carrier K, commonly known as the "first elevator."

The foregoing parts may all be constructed and arranged to operate in the same manner as the corresponding parts of the commercial linotype-machine, (illustrated in all essential details in Letters Patent Nos. 436,532 and 557,000,) or any equivalent mechanisms adapted to assemble the lines of matrices and spacers and deliver them to the elevator K may be employed, these parts of the machine not being of the essence of my invention.

Figure 2:
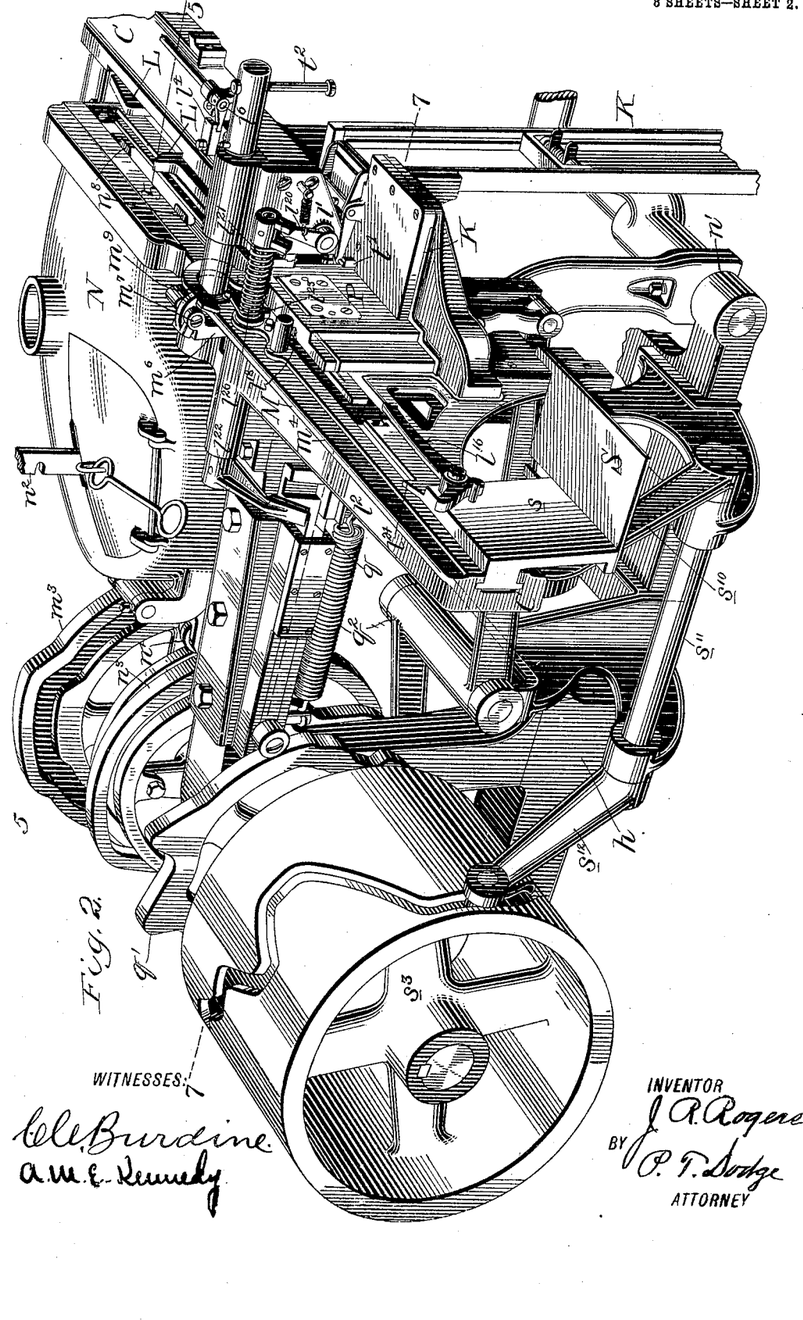
Fig. 2 is a perspective view of the casting and ejecting mechanisms and adjacent parts.
Figures 5, 6:
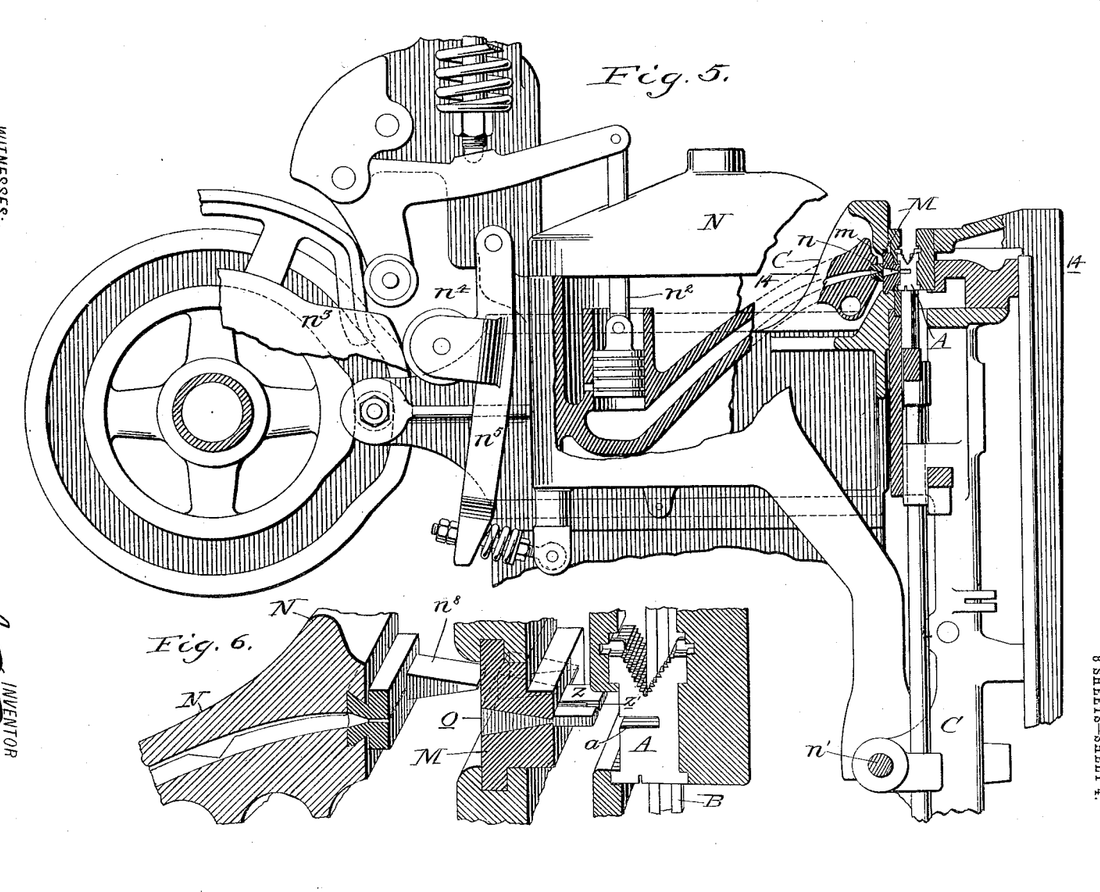
Fig. 5 is a vertical section from front to rear through the casting mechanism on the line 5 5 of Figs. 1 and 2.
Fig. 6 is a perspective view of the parts, partly in section, on the same plane as Fig. 5, showing particularly the matrix-line, the logotypes, and the mouth of the pot in the position in which they appear after the logotypes are withdrawn from the matrices in which they are cast.
Figures 7, 8, 9:
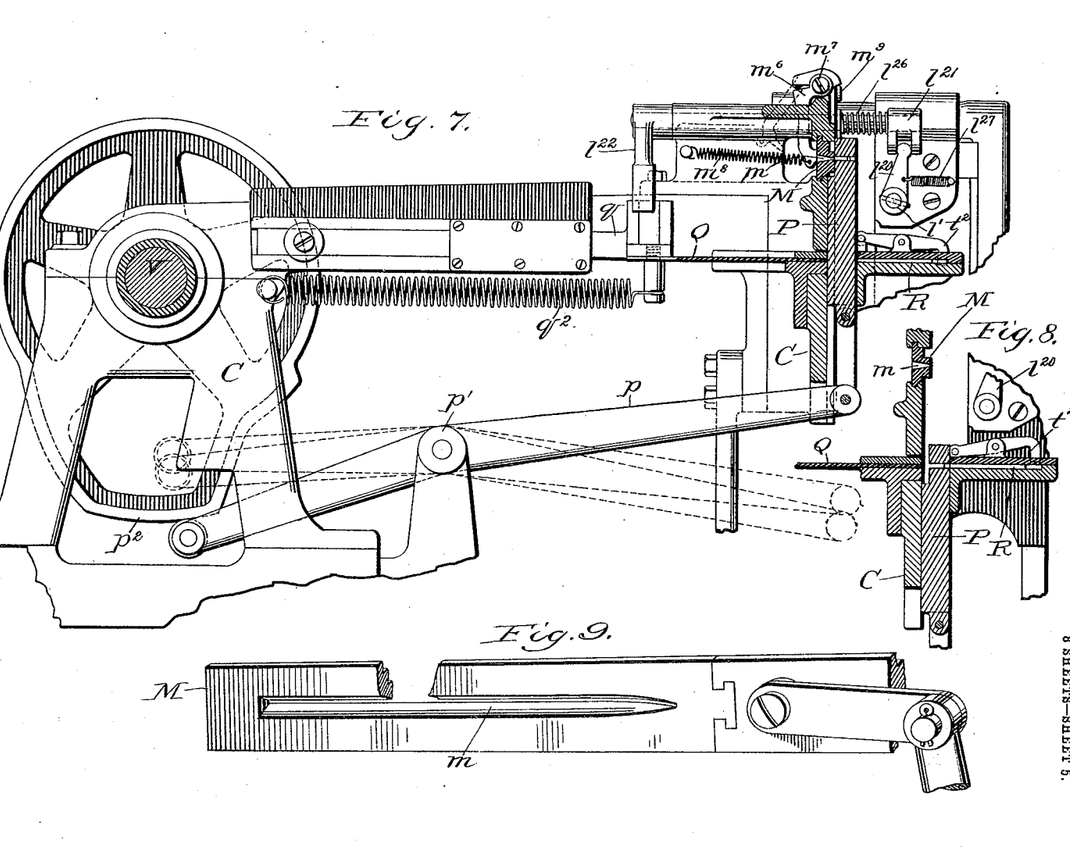
Fig. 7 is a vertical section from front to rear through the ejector and mechanisms for delivering the logotypes thereto on the line 7 7 of Figs. 1, 2, 10, and 11.
Fig. 8 is a similar view of the leading parts in the ejecting position.
Fig. 9 is a perspective view of the gate or sprue plate closing the slot in the matrices in which the logotypes are cast.
Figure 13:
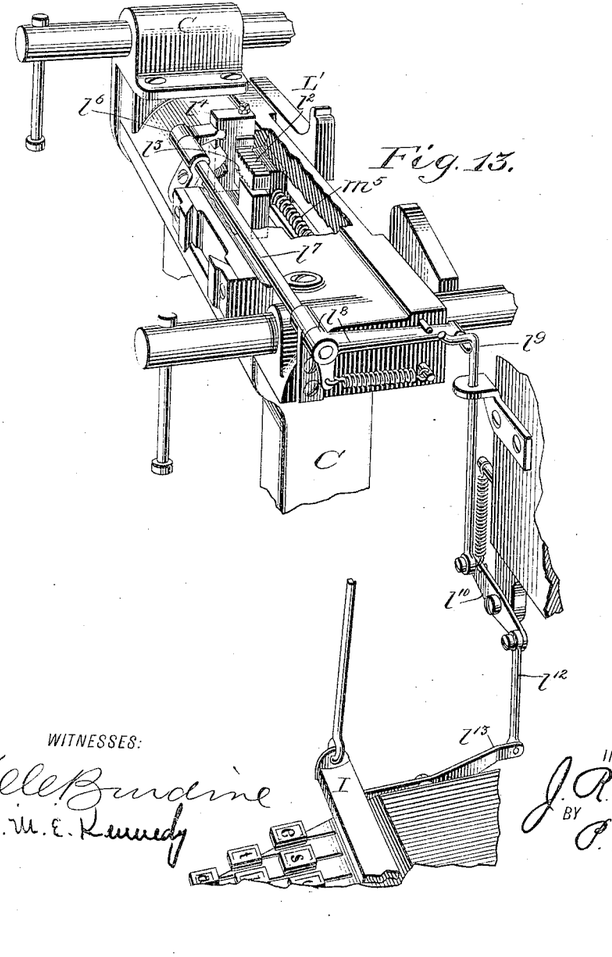
Fig. 13 is a perspective view from the front, showing principally the devices for confining the line of matrices and for permitting the elongation of the line as the successive spacers are introduced.

The composed line is lowered by the descent of the elevator K to the casting position between two jaws L and L', Figs. 2 12 13, &c., whereby the line is confined endwise, as in the linotype-machine. The line thus lowered is presented in front of a horizontally-slotted sprue-plate M, Figs. 5 to 9, which serves to close the rear side of the slots or cells in the matrices. This plate is constructed, as shown in Fig. 9, with a horizontal slot or gate $m$ of dovetail form, through which the molten metal is delivered into the series of matrices and spacers. The sprue-plate when in operative position communicates at its rear side with the delivery-mouth $n$ of the melting-pot N, arranged to swing forward and backward on a horizontal axis $n'$, fixed in the main frame. When the parts are assembled in operative position, as shown in Fig. 5, the mouth of the pot is forced tightly against the rear side of the sprue-plate, which is in turn forced tightly against the edges of the matrices, so that when metal is delivered from the pot it will pass through the plate and fill the cavities in the matrices and spacers, thus producing at one operation the series of logotypes Z and intermediate justifying-spaces $z$. It will be understood that the spacers fit edgewise against the sprue-plate and serve to separate the logotypes from each other and from the spaces when they are cast.

Figures 3, 4:
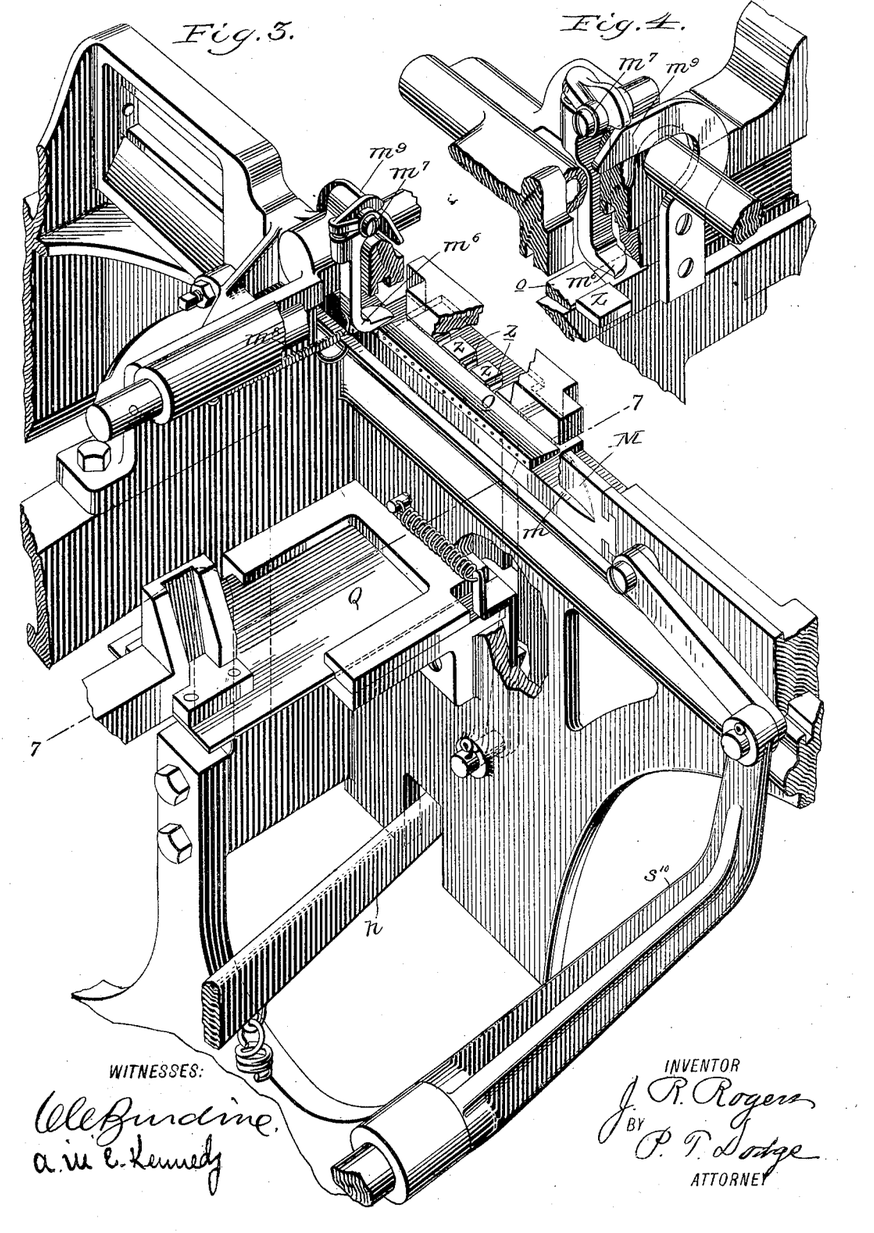
Fig. 3 is a perspective view of the leading parts shown in the preceding figure viewed from the rear.
Fig. 4 is a perspective view from the front, showing principally a device for removing the sprue from the base of the linotypes.

The pot contains, as in the linotype-machine, a mechanically-actuated pump-plunger $n^2$, whereby the molten metal is driven through its delivery-mouth at the proper times. The forward movement of the pot is effected by a cam $n^3$, acting on a roller $n^4$, carried on lever $n^5$, yieldingly connected to the back of the pot, as usual. Subsequent to the casting action the cam ceases its forward pressure and the pot recedes, thereby separating its mouth from the sprue-plate, as shown in Fig. 6. The metal delivered into the plate M forms therein a sprue or gate $o$, connecting the series of logotypes and spaces at their base, as shown in Figs. 3 and 6. This sprue is utilized to withdraw the logotypes and spaces from the cells in which they are cast, as shown in Fig. 6, the sprue-plate M being moved backward away from the composed line for the purpose. This movement is effected by mounting the plate, as shown in Figs. 5 and 14, in the laterally-projecting arm of a horizontal slide $m^2$, mounted in the main frame, as shown in Fig. 14, and actuated by a grooved cam $m^3$. When the sprue-plate M is retracted, the series of logotypes and spaces, still fast upon the forward edge of the sprue, are sustained thereby, as shown in Fig. 6.

It is necessary that the logotypes and spaces shall be assembled in line and transferred to the receiving-galley. I therefore mount the sprue-plate M to slide horizontally from its support $m^2$ to the left through a groove $m^4$ in the main frame to the position shown in Figs. 2, 3, 4, and 7, whereby the protruding logotypes and spaces are carried into a horizontal slot in the upper end of a vertical slide P, mounted in the main frame. While the parts are in this position, as shown in Fig. 7, the slide P descends, thereby breaking the logotypes and spaces away from the sprue $o$ and carrying them downward to a position directly in front of a horizontal ejector-blade Q, as shown in Figs. 7, 8, and 10, which advances from the rear and pushes the line of logotypes and spaces forward out of the slide P into a slot R in the main frame. This slot is open at one end, and while the line is seated therein a horizontal pusher-blade S, Fig. 10, advances from the left against the end of the line, carrying the same forward from the support R into the upper end of the galley T. During this movement the logotypes and spaces are caused to close together in the form of a compact justified line of the predetermined length. This line, entering the top of the galley above a yielding support $t$, is forced downward by a depressing-arm $t^2$, turning on a horizontal axis at the rear and actuated as hereinafter described.

From the foregoing it will be perceived that the line of logotypes and justifying-spaces is cast in the matrices and the intervening spacers and integral with the sprue or gate. The retreat of the pot and the subsequent retreat of the sprue-plate leaves the entire line of castings attached to the sprue, which is thus utilized as a means of carrying the line horizontally to the left into the vertical slide, which in turn breaks the castings loose from the sprue and carries them downward to the ejector, which delivers them in advance of the horizontal slide, which finally delivers them into the galley, thus completing the cycle of operations. After the line is thus delivered the various parts resume their original positions, the line of matrices and spacers being lifted by the carrier K from the casting position to the distributing devices, by which they are returned to their magazines. The next line composed is in turn presented to the elevator K between the jaws and in front of the plate M, which is closed against them, after which the pot is advanced, and the second casting operation proceeds in the same manner as the first.

After the descent of the slide P has broken the castings away from the sprue in the plate M it will sometimes be necessary to positively remove the sprue. I therefore round the groove $m$ in the sprue-plate at one end, as shown in Figs. 3 and 9, and pivot on the main frame, as shown in Figs. 3, 4, and 7, a finger $m^6$, adapted to enter the groove $m$ beyond the sprue, as shown in Fig. 3, so that when the sprue-plate M moves back toward the casting position the sprue will be held and compelled to pass out of the plate. This sprue-delivering finger $m^6$ is mounted on a horizontal pivot $m^7$ and drawn backward out of action by a spring $m^8$. Its advance to the operative position is caused by a cam-surface $m^9$, carried on the end of the sprue-plate.

The mechanism for receiving the matrices and spacers from the elevator K and effecting their distribution is foreign to the present invention and may be in all respects identical with that used in the Mergenthaler machine and represented in United States Letters Patent Nos. 436,532 and 557,000.

In practice it is necessary to adjust the machine for casting lines of any different length or measure. For this purpose the matrix-confining jaw L' is made adjustable endwise and an adjustable stop provided to limit the distance to which it can be separated from the opposing jaw L. The stop device consists, as in the linotype-machine, of a sliding nut or banking-piece $l$, carried by a screw $l'$ in the main frame, as shown in Figs. 11, 12, &c., so that it may be moved forward or backward.

As the spacers B have at their operative point a thickness greater than that of the space which is cast in them, the distance to which the jaws are separated must be increased beyond the length of the predetermined line a distance proportioned to the increased thickness of the spacers. Otherwise the logotypes and cast spaces would not make a line of the required length. To provide automatically for the increased separation of the jaws to compensate for the thickness of the spacers, I connect the banking-piece $l$ with the jaw L' and with the keyboard by devices which permit the jaw to move back automatically each time that a spacer is designated for the line a distance appropriate to the thickness of the spacer. As shown in the drawings, the jaw L' has in one side a rib provided with ratchet-teeth $l^2$ and $l^3$ on the upper and lower sides. The banking-piece $l$ carries a vertical slide $l^4$, slotted to straddle the toothed rib on the jaw and having two sets of teeth to engage the teeth on the jaw. By moving the slide $l^4$ upward and downward while the jaw is subjected to the backward pressure of a spring $m^5$ the jaw is permitted to move backward one tooth at a time, the action of the parts being similar to that of an ordinary toothed escapement. The slide $l^4$ is connected, as shown in Figs. 11 and 13, with an arm $l^6$ on one end of a rock-shaft $l^7$, the opposite end of which is provided with an arm $l^8$, acted upon by a rod $l^9$, which is in turn connected, as shown in Fig. 13, by lever $l^{10}$ and link $l^{12}$ with a lever $l^{13}$, pivoted on the keyboard of the machine and subjected to the downward action of the space-delivering key I, before referred to. When, therefore, the key I is depressed to insert a spacer into the line in course of composition, it has the effect of moving the jaw L' backward beyond its normal position a distance sufficient to compensate for the excess of thickness of one spacer. It follows, therefore, that as the composition of the line progresses the jaws L and L' are separated beyond the length required for the printed line a distance equal to the excess of thickness of the spacers in the line, whatever their number may be. When the spacer-key I is released, the springs $l^{14}$ and $l^{15}$ return the escapement-slide and its connections to their normal position.

When the composed line is seated in the casting position between the jaws L and L', justification is effected by pushing the sliding members of all the spacers B upward through the line, the effect being to widen the spacers at the operative point and increase their width until the matrix-line is expanded tightly against the confining-jaws L and L', the same action increasing the width of the molds in the spacers to a corresponding extent. This adjustment of the spacers is effected by a vertical slide U, guided in the main frame and actuated by a lever and cam connections in the same manner that the justifying-slide is operated in the linotype-machine or in any other appropriate manner.

After the casting operation it is necessary that the matrix-line, wedged tightly between the jaws, should be relieved endwise in order that it may be lifted to the distributing mechanism. This release is effected by turning the screw $l'$, Fig. 12, slightly backward. The mechanism for this purpose is shown in Figs. 1, 7, &c., in which—

$l^{20}$ represents an arm secured on the end of the screw $l'$ and engaging a notched head on the end of the horizontal sliding and turning rod $l^{21}$, mounted in the main frame and carrying at its front end a second arm $l^{22}$. This arm $l^{22}$ is adapted to swing laterally into a notch in the horizontal slide $q$, Figs. 2 and 7, which carries the ejector-blade. The turning of the rod to effect this engagement is secured by a shoulder $l^{23}$ on the rod in position to be acted upon by a shoulder $l^{24}$ on the slide $s$, Fig. 2. When the slide $s$ moves forward, its shoulder $l^{24}$, engaging the shoulder on the rod $l^{21}$, turns the latter so that the arm $l^{22}$ enters the notch in slide $q$. The parts retain their disengagement while the ejector-slide is retreating, and the effect is to turn the screw $l'$ and permit the slight retreat of the jaw L' to loosen the line. When the shoulder $l^{24}$ retreats, a spring $l^{26}$, encircling the rod $l^{21}$, causes the disengagement of arm $l^{22}$, whereupon a spring $l^{27}$, Figs. 1 and 7, turns the screw $l^{21}$ and advances the jaw-support or banking-piece to its normal position.

After the matrix-line has been lifted from the casting position it is necessary that the jaw L' shall be moved forward to its normal or receiving position. This is effected, as shown in Figs. 1 and 11, by an arm $l^{16}$, pivoted to the slide $s$, mounted in the main frame and carrying the pusher-plate S, before referred to. When the slide $s$ moves back to the left, the arm $l^{16}$ is carried to a position which admits of its end falling behind the jaw L'. When the slide $s$ moves forward to cause the delivery of the line to the galley, the arm $l^{16}$, engaging the rear end of the jaw, pushes the latter forward to its normal position. The arm is tripped out of engagement and held above the jaw, so that the latter may step backward, as before described, by screw $l^{18}$, mounted on the main frame in position to encounter the rear end of the arm $l^{16}$ as the latter completes its forward movement.

In order to permit the casting of slugs of various lengths, the slot or gate in the sprue-plate M is made of a length equal to that of the longest slug, as shown in Fig. 9. When the slug to be cast and the matrix-line are of a length less than this slot, it is manifest that the ends of the slot must be closed, or, in other words, the slot shortened to prevent the escape of the molten metal. This is accomplished, as shown in Figs. 2 and 6, by providing the mouth of the melting-pot N with V-shaped projections $n^8$, adapted to enter the slot in the sprue-plate M. The mouthpiece is dovetailed to the pot and is removable endwise, so that it may be readily replaced by another having the projections at any required distance apart.

Motion is communicated to the various parts above referred to as follows: The slide $s$, carrying the line-delivery plate S and the jaw-returning arm $l^{16}$ receives motion, as shown in Fig. 2, from arm $s^{10}$ on one end of a rock-shaft seated in the main frame and carrying a second arm $s^{12}$ with a stud or roller entering a cam-groove in the periphery of a wheel $s^{13}$, mounted on the main shaft V. This slide $s$ is also connected, as shown in Fig. 9, by a horizontal joint to the end of the sprue-plate M, which receives its longitudinal motion therefrom. The joint between these parts permits the sprue-plate M to move forward and backward, as before described, without destroying its connection with the operating-slide. The vertical slide P for lowering the cast-line and breaking the same from the sprues receives motion from a lever $p$, pivoted in the main frame at $p'$ and acted upon at its rear end by cam $p^2$ on the main shaft. The ejector-blade Q, attached to slide $q$, is moved in one direction by the cam $q'$ on the main shaft and in the opposite direction by spring $q^2$, connecting the slide with the main frame. The depressor $t^2$ for forcing the lines downward in the galley is lifted, as shown in Fig. 10, by a spring $t^3$ and depressed by a shoulder $t^4$ on the vertical slide P. (See Fig. 1.)

Having described my invention, what I claim is—

1. In a logotype-machine, a line of matrices slotted to form logotype-molds, in combination with expansible spacers seated in the line between the word groups and each containing a mold or cavity to form a justifying-space.

2. In a logotype-machine, a line of slotted matrices comprising word groups, in combination with intermediate spacers containing space-molds and adjustable to vary their width in the line and the width of the molds.

3. In an organized logotype-machine, separable matrices arranged in word groups and slotted to form logotype-molds, in combination with a separable sprue-plate coöperating directly with and closing the slot in the matrices, whereby said plate is adapted to serve as a means of closing the mold on one side, and also as a means of withdrawing the logotype from the mold.

4. In a logotype-machine, the combination of the deeply-slotted matrices arranged in word groups, spacers located between the word groups and containing space-molds, and a sprue-plate coöperating directly with the edges of the matrices and spacers, substantially as shown.

5. In a logotype-machine, the combination of deeply-slotted matrices having the matrix characters at the bottom of the slots, intermediate expansible spacers covering the sides of the slots in the adjacent matrices, a separable sprue-plate common to the series of matrices, and means for delivering molten metal through said plate into the matrices.

6. In an organized logotype-machine, the combination of deeply-slotted matrices, spacers, means for assembling the matrices in word groups with spacers between the groups, a sprue-plate to coöperate with the matrices, means for delivering molten metal through the plate into the matrices, means for bringing said parts into operative relation, means for withdrawing the logotypes from the matrices by means of the sprue and thereafter separating the sprue from the logotypes.

7. In a logotype-machine, the combination of slotted matrices, a coöperating sprue-plate, means for separating the plate and matrices to withdraw the logotypes from the matrices, and means for separating the sprue from the logotypes.

8. In a logotype-machine, word groups of matrices, spacers separating the groups, and means including a sprue-plate for casting simultaneously a plurality of logotypes connected by a sprue, means for transferring the connected logotypes from the casting position, means to receive and sustain the logotypes thus transferred, and means for separating the sprue from the logotypes while thus sustained.

9. In a machine for producing composed lines of logotypes, the combination of means for casting the series of logotypes on a single sprue, means to support the logotypes, means for transporting the line by means of the sprue to the support, means for removing the sprue from the logotypes, a galley, and means for closing the logotypes together and advancing them to the galley.

10. In combination, means for casting a series of logotypes on a connecting-sprue, means for separating the sprue therefrom, and means for closing the logotypes together in line.

11. In combination, means for casting a series of logotypes and intermediate justifying-spaces on a common sprue, means for retracting the sprue to withdraw the logotypes and spaces from their molds, and means for detaching the sprue and closing the logotypes and spaces together in a compact line.

12. A line of slotted matrices, and expansible spacers containing expansible molds, in combination with means for assembling them in line, means for casting a series of logotypes and spaces therefrom, and means for assembling the logotypes and spaces in line.

13. Means, including a sprue-plate, for casting a series of logotypes and spaces on a common sprue, means for retracting the sprue-plate and moving the same endwise to transfer the logotypes, a support for the logotypes, and means to detach the sprue.

14. In a machine for producing lines of logotypes, word groups of matrices and intermediate spacers, in combination with a sprue-plate, a metal-pot and means for delivering metal therefrom, means for closing the plate against the matrices, and the pot against the plate, and thereafter retracting and separating the pot and plate, and means for moving the plate to transfer the sprue and the attached logotypes.

15. The sprue-plate and means for casting therein a sprue with attached logotypes, means for moving the plate endwise, a carrier to which the logotypes are presented by said movement, an ejector to deliver the logotypes from the carrier, and a support for the ejected logotypes.

16. In combination with the slotted sprue-plate and the coöperating pot, the projections on the pot to fill the ends of the slot in the plate.

17. In a logotype-machine, matrices, spacers, means for assembling them in line and jaws to confine the line endwise, in combination with means for separating the jaws according to the number of spacers in the line.

18. The combination in a logotype-machine of a jaw to confine the matrix-line, means for inserting spacers in the line, and means actuated thereby to cause a retreat of the jaw each time that a spacer is inserted.

19. In an organized logotype-machine, the combination of slotted matrices, means for assembling the same in line, expanding spacers adapted for insertion between the word groups of matrices, across the slots therein, means for inserting said spacers, means for casting a series of logotypes at one operation in the matrices between the spacers, means for separating the logotypes from the matrices, and means for advancing the logotypes laterally and assembling them in a continuous, justified line.

20. In a logotype-machine, slotted matrices arranged in groups with separators between the groups, in combination with means supplying molten metal thereto, means for withdrawing the logotypes, and means for assembling the logotypes in compact lines.

21. The slotted matrices, spacers, sprue-plate, and means for delivering molten metal thereto, in combination with means for shifting the sprue-plate, and means for separating the logotypes from the sprue and assembling them in line.

22. In a logotype-machine, means for sustaining a line of matrices and separators between them, a sprue-plate, means for delivering molten metal through the plate, and means for retracting the plate and thereafter moving it endwise to transfer the logotypes from the casting-point.

23. In a typographic machine, a matrix-confining jaw L', a spring tending to move the same backward from the line, a toothed escapement to control its retreat, and connections thence to a space-delivering key, whereby the liberation of the space is caused to effect the retreat of the jaw.

24. In combination with the sliding jaw L provided with two series of teeth, means for moving the jaw, and the controlling device or escapement $l^4$ having two sets of teeth.

25. In combination with the longitudinally-movable sprue-plate M, the finger $m^6$ to dislodge the sprue.

26. In combination with the vertically-movable slide P and means for delivering the series of logotypes thereto, the ejector Q and a support R to receive the logotypes.

27. In combination with the galley, the support R, means for delivering a series of logotypes to said support, and a slide S, to deliver the logotypes to the galley.

In testimony whereof I hereunto set my hand, this 3d day of May, 1905, in the presence of two attesting witnesses.

JOHN R. ROGERS.

Witnesses:
 DAVID S. KENNEDY,
 J. B. BUCKLEY.